United States Patent
Irani

(10) Patent No.: US 6,993,570 B1
(45) Date of Patent: Jan. 31, 2006

(54) SYSTEM AND METHOD FOR PUSHING PERSONALIZED CONTENT TO SMALL FOOTPRINT DEVICES

(75) Inventor: Boman Irani, Stittsville (CA)

(73) Assignee: Sun Microsystems, Inc., Santa Clara, CA (US)

( * ) Notice: Subject to any disclaimer, the term of this patent is extended or adjusted under 35 U.S.C. 154(b) by 418 days.

(21) Appl. No.: 09/333,383

(22) Filed: Jun. 15, 1999

(51) Int. Cl.
G06F 17/60 (2006.01)
H04Q 7/20 (2006.01)

(52) U.S. Cl. ............... 709/218; 709/227; 709/249; 455/422; 370/277

(58) Field of Classification Search ............... 709/203, 709/224, 227, 230, 220, 232, 201, 202, 249, 709/218; 705/34; 713/182; 235/375; 370/227, 370/310, 277; 455/422, 426
See application file for complete search history.

(56) References Cited

U.S. PATENT DOCUMENTS

| | | | |
|---|---|---|---|
| 5,745,884 A * | 4/1998 | Carnegie | 705/34 |
| 5,809,415 A * | 9/1998 | Rossmann | 455/422 |
| 5,936,915 A * | 8/1999 | Fujii et al. | 369/13.42 |
| 5,970,474 A * | 10/1999 | LeRoy et al. | 709/221 |
| 5,979,757 A * | 11/1999 | Tracy et al. | 235/283 |
| 6,038,545 A * | 3/2000 | Mandeberg et al. | 705/15 |
| 6,175,922 B1 * | 1/2001 | Wang | 713/182 |
| 6,199,753 B1 * | 3/2001 | Tracy et al. | 235/375 |
| 6,253,122 B1 * | 6/2001 | Razavi et al. | 701/1 |

OTHER PUBLICATIONS

Jini™ Architecture Specification, Version 1.0.1, Nov. 1999, Sun Microsystems, Inc., pp. 1-21.

* cited by examiner

Primary Examiner—Khanh Quang Dinh
(74) Attorney, Agent, or Firm—Meyertons Hood Kivlin Kowert & Goetzel, P.C.; B. Noël Kivlin

(57) ABSTRACT

A containment framework sufficiently compact and efficient to run on a wide variety of resource-constrained, small footprint devices, such as personal data assistants (PDAs), smart cellular phones, global positioning system (GPS) receivers, etc. The containment framework may support services which integrate with network-based services to deliver personalized content to small footprint device users.

34 Claims, 13 Drawing Sheets

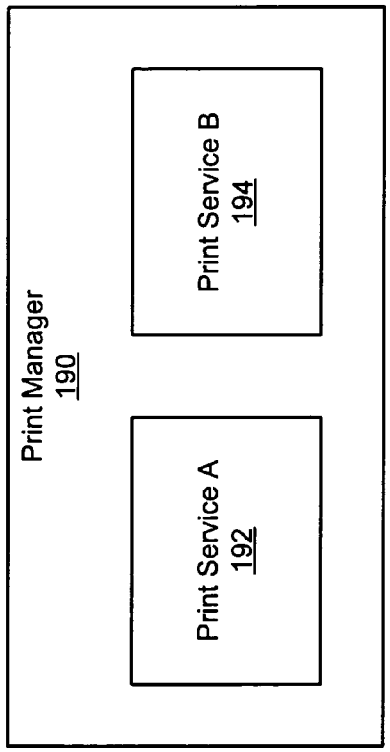
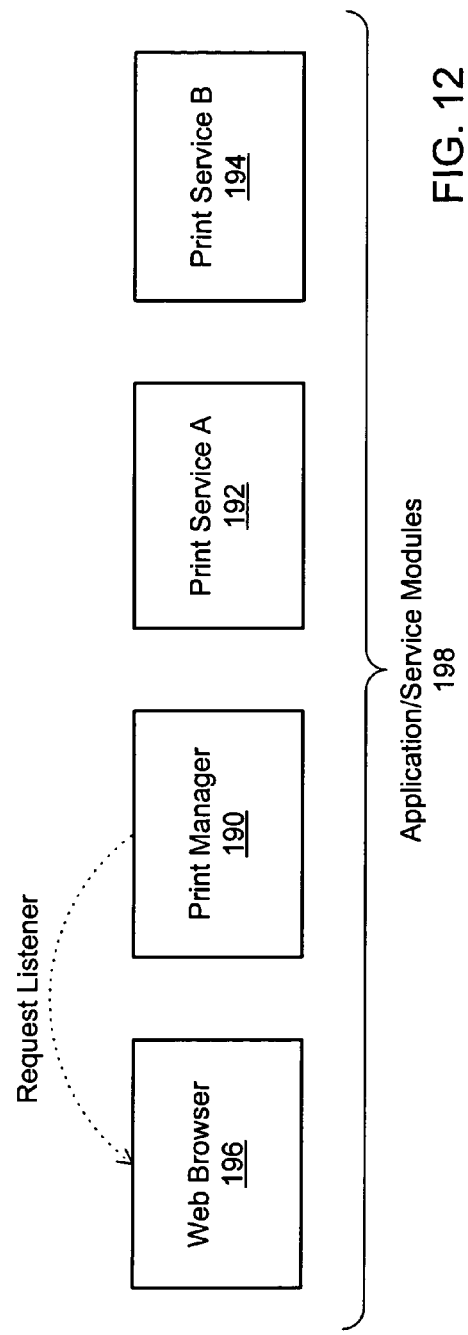

SYSTEM AND METHOD FOR PUSHING PERSONALIZED CONTENT TO SMALL FOOTPRINT DEVICES

BACKGROUND OF THE INVENTION

1. Field of the Invention

The present invention relates to the field of small footprint, resource-constrained devices such as handheld computers, personal data assistants (PDAs), cellular phones, etc. More particularly, the present invention comprises a system and method for pushing personalized content to small footprint devices.

2. Description of the Relevant Art

The field of "smart" small footprint devices is growing and changing rapidly. Small footprint devices include handheld computers, personal data assistants (PDAs), cellular phones, global positioning system (GPS) receivers, game consoles, and many more such devices. These devices are becoming more intelligent and interconnected. Technologies such as Jini from Sun Microsystems, Inc. and initiatives such as the Open Service Gateway Initiative (OSGI) are expanding the traditional concepts of computer networks to include small footprint devices.

This increased device interconnection has introduced a need for both new types of computing services and new ways to integrate computing services, both inter-device-based and intra-device-based services. A "service" is an entity implemented within or accessible from a device that can be used by a person, an application, or another service. The concept of a service is broad and can be considered at many different scales. For example, services include familiar network-based services such as shared printing, email, telephony, etc. Services also include less familiar examples such as an energy management service which may control the power consumption of devices within a local network, a diagnostic service which allows a device to send information to a service technician when an error occurs, a health-monitoring service which immediately notifies health professionals of an emergency, etc.

Services also include modules or applications located and executable within a local machine or device. For example, local application programs may utilize a calendar service, a contact list service, a bookmark service, etc. In this example, an application program may use these services together to allow a user to select a person from the contact list, record an appointment time for a meeting with the person, and create a bookmark for easy access to the appointment entry.

It is becoming more common today to execute multiple services and applications together in a single small footprint device. However, since memory, processing power, and other resources are typically very limited in small footprint devices, a specialized lightweight containment framework is necessary to achieve the desired integration of services and applications. It is also desirable that the framework be flexible and extendable enough to provide support for any types of services and applications for any kind of small footprint device. A further goal is that the framework be compatible and integrated with off-device services such as services available to devices in a Jini network. Such a lightweight, extendable, network service-compatible application/service containment framework is described herein.

The service integration enabled by the application/service containment framework enables services executing on small footprint devices to operate in conjunction with network-based services in order to gather and deliver personalized information to a small footprint device user. A system and method for delivering personalized content such as advertisements are presented herein.

SUMMARY OF THE INVENTION

The present invention comprises a system and method to deliver personalized content to a small footprint device. This ability may be enabled by applications/services built on a lightweight containment framework for a small footprint device executing in conjunction with network-based computing services. A containment framework for small footprint device applications/services is described herein. One embodiment of this containment framework is referred to as York 1.1. The containment framework enables module registration, lookup, instance tracking, etc. Modules in the containment framework may be used by other modules as services. The containment framework may be dynamic, allowing modules to be registered and loaded as desired or needed.

As described above, a containment framework for a small footprint device should be lightweight. The containment framework is able to function on a device with very little memory. For example, in one embodiment the containment framework may function on a device with only 300 KB writeable memory and still leave enough memory space for several modules to operate. In addition, the containment framework may be responsive on devices with low processing power, such as small footprint devices with 16 MHz-class chips.

The containment framework may be based on common standards. For example, in one embodiment, the containment framework may be written in pure Java and may be fully compliant with and executed in the PersonalJava 3.0 application environment. PersonalJava is a Java application environment specifically designed for consumer devices for home, office, and mobile use. It comprises the Java virtual machine (JVM) and a subset of the Java Application Programming Interface (API), including core and optional APIs and class libraries. In addition, the PersonalJava API includes specific features required by consumer applications in resource-limited environments. It is noted that the containment framework may also be comprised in hardware ROM or be compiled into native code.

Because the containment framework may be based on common standards, it may be ported easily to different device types and to devices made by different vendors, which greatly reduces time-to-market and development costs. The extendable architecture of the framework may also allow new modules to be introduced into the framework as needed or desired for different devices or services. The architecture may also allow for customizable and scaleable user interfaces. For example, the user interface component of an application may be swapped out as appropriate to the display type for different devices.

A system may comprise a set of core service modules available for other modules to use. These core services may include services such as the calendar, contact list, and bookmark services described in an example above. Together with such core services, the containment framework provides a complete architecture for running an integrated suite of applications and services on a small footprint device. For example, the Personal Applications suite available from Sun Microsystems, Inc. is built around one embodiment of the containment framework. The Personal Applications suite comprises an integrated set of compact, memory-efficient applications, including the Personal Applications Browser, the Personal Applications Email Client, and the Personal Organizer.

Various services may be built on the above-described framework which run on a small footprint device and communicate with off-device services to establish a system for gathering personal information from a small footprint device user, storing the information, and analyzing the information to send particular content to a small footprint device user.

BRIEF DESCRIPTION OF THE DRAWINGS

Other objects and advantages of the invention will become apparent upon reading the following detailed description and upon reference to the accompanying drawings in which:

FIGS. 11 and 12 illustrate the use of module request listeners in the containment framework to simulate a hierarchical containment environment;

Figure 1:
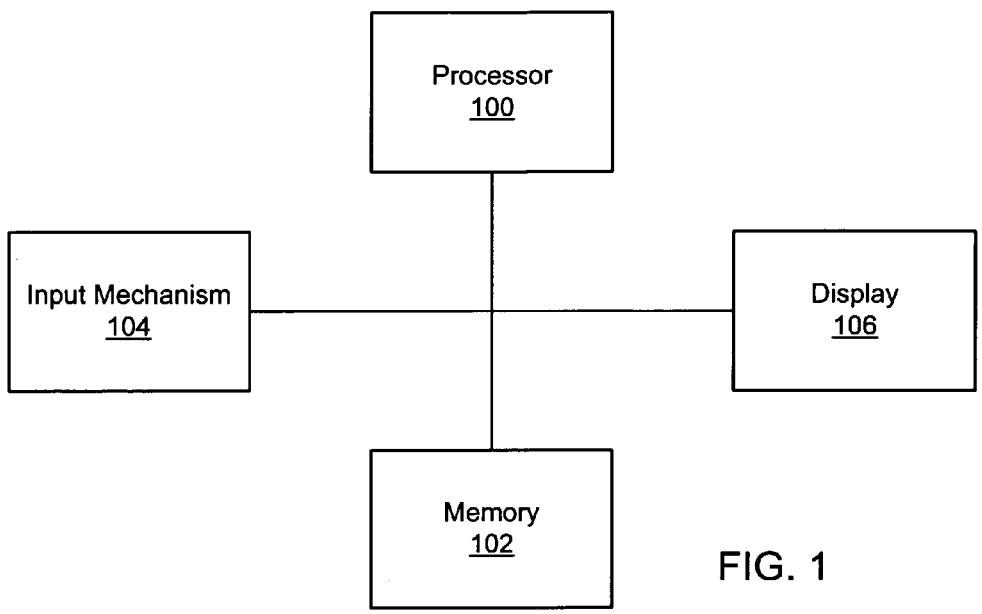
FIG. 1 is a block diagram illustrating the hardware architecture of a typical small footprint device.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Hardware Architecture Block Diagram

FIG. 1 is a block diagram illustrating the hardware architecture of a typical small footprint device. As used herein, a small footprint device is a hardware device comprising computing resources such as a processor, a system memory, and a display mechanism, but having significantly greater constraints on one or more of these resources than a typical desktop computer has. For example, a small footprint device may have two megabytes of memory or less, whereas a typical desktop system may have 64 megabytes or more. Also a typical small footprint device may have significantly less processing power than a typical desktop computing system, either in terms of processor type, or processor speed, or both. For example, a personal data assistant device may have a 16 MHz processor, whereas a typical desktop system may have a processor speed of 100 MHz or higher. Also, a typical small footprint device may have a display size significantly smaller than the display screen of a desktop computing system. For example, the display screen of a handheld computer is typically small compared to the display screen of a desktop monitor.

It is noted that the specific numbers given are exemplary only and are used for comparison purposes. For example, a personal data assistant having eight megabytes of memory or more may still be a small footprint device, although the device has more memory than the typical figure of two megabytes given above.

Small footprint devices may also have constraints on other resource types compared to typical desktop computing systems, besides the memory, processor, and display size resources described above. For example, a typical small footprint device may not have a hard disk, may not have a network connection, or may have an intermittent network connection, or may have a wireless network connection, etc.

Many small footprint devices are portable and/or are small compared to desktop computers, but are not necessarily so. Also, small footprint devices may typically have a more limited or narrow range of usage possibilities than a typical desktop computing system. Small footprint devices are include in, but are not limited to, the following examples: handheld computers, wearable devices (e.g., wristwatch computers), personal data assistants (PDAs), "smart" cellular telephones, set-top boxes, game consoles, global positioning system (GPS) units, etc. Since new classes of consumer devices are rapidly emerging, it is not possible to provide an exhaustive list of small footprint devices. However, the term "small footprint device" is intended to include such devices as may reasonably be included within the spirit and scope of the term as described above.

FIG. 1 illustrates a block diagram of a typical small footprint device. It is noted that the small footprint device may have various different architectures, as desired. The hardware elements not necessary to understand the operation of the present invention have been omitted for simplicity.

As shown in FIG. 1, the small footprint device contains a processor. The processor may be any of various types, including an x86 processor, e.g., a Pentium class, a PowerPC processor, as well as other less powerful processors or processors developed specifically for small footprint devices. The processor may have various clock speeds, including clock speeds similar to those found in desktop computer-class processors, as well as lower speeds such as 16 MHz.

Also shown in FIG. 1 the device includes a system memory. The system memory may comprise memory of various types including RAM or ROM. A typical small footprint device may have a very small memory storage capacity compared to a typical desktop computer system.

As shown in FIG. 1, a small footprint device may also comprise one or more input mechanisms. The input mechanism may be any of various types, as appropriate to a particular device. For example, the input mechanism may be a keypad, mouse, trackball, touch pen, microphone, etc.

As shown in FIG. 1, a small footprint device may also comprise one or more display mechanisms. The display mechanism may be any of various types, as appropriate to a particular device. The display mechanism for a typical small footprint device, such as a smart cellular phone, may be small compared to the display of a desktop computer system.

Figure 2:
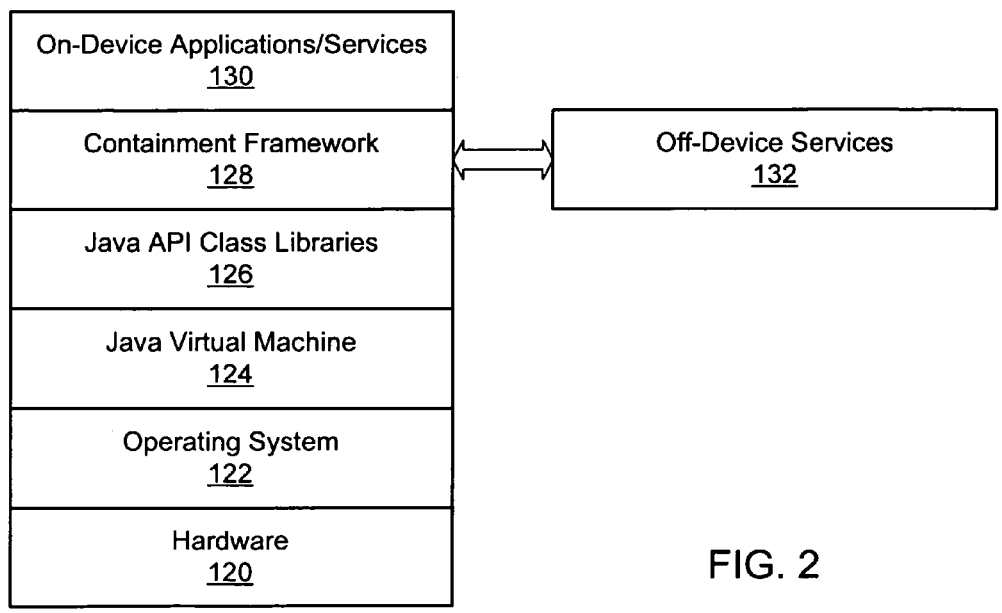
FIG. 2 illustrates a typical hierarchy of hardware/software layers involved in a system running applications and services within the containment framework.

FIG. 2—Hardware/Software Hierarchy Diagram

FIG. 2 illustrates a typical hierarchy of hardware/software layers involved in a system running applications and services within the containment framework. The drawing is exemplary, and various layers may be added, combined, or omitted as appropriate for a particular device or implementation.

The base layer shown in FIG. 2 is the device hardware layer, which comprises the hardware resources necessary to support a software system, such as a processor and system memory. In one embodiment, the hardware of a small footprint device, such as the small footprint device hardware example illustrated in FIG. 1, implements the hardware layer illustrated in FIG. 2. However, in other embodiments, the hardware layer may be implemented in other types of devices, such as a desktop computer, or a device with even greater resource constraints than a typical small footprint device, such as a smart card.

As shown in FIG. 2, the next layer up from the hardware layer is the operating system layer. As is well known in the art, the operating system functions as an interface layer between the device hardware and software running on the device and serves as a manager for low-level tasks such as input/output, memory management, etc. The operating system illustrated in FIG. 2 may be any particular operating system which supports the higher layers shown in FIG. 2. The operating system may be a small and efficient one that is suitable for or written particularly for use in a small footprint device. For example, the operating system may be the JavaOS operating system available from Sun Microsystems, Inc.

In one embodiment, the containment framework is implemented in a Java application environment as one or more Java classes. As shown in FIG. 2, the Java virtual machine and Java application programming interface (API) class libraries layers are the next layers up from the operating system. These two layers together make up the Java application environment, or Java platform. Classes implementing the containment framework may be built using the Java libraries and compiled into bytecodes. The bytecodes are instructions which execute on the Java virtual machine, which interacts with the operating system and/or the device hardware.

In one embodiment, the containment framework is implemented in the PersonalJava Java application environment, which is a Java platform designed to be highly scalable, modular, and configurable, while requiring minimal system resources. PersonalJava comprises the Java virtual machine and a subset of the Java API, including core and optional APIs and class libraries. In addition, the PersonalJava API includes specific features required by consumer applications in resource-limited environments, such as a specialized version of the Java abstract window toolkit (AWT). The PersonalJava AWT library is targeted and tuned for consumer product look and feel, providing graphics and windowing features while supporting low-resolution displays and alternate input devices (via an extended event model for mouse- and keyboard-less devices).

Referring again to FIG. 2, the containment framework is shown as the next layer up from the Java platform layer. As noted above, the containment framework may also be based on other platforms. As described in detail below, the containment framework manages program modules, e.g. by enabling module registration, lookup, instance tracking, etc. Modules may provide various services. The containment framework enables modules to request other modules, in order to use their services. Applications may be implemented as modules that utilize the services of other modules. The containment framework thus provides a lightweight, extendable service and application framework, enabling applications to coexist and share a modular code base.

This type of extendable architecture enabling multiple program modules to cooperate is an important development for small footprint devices. Small footprint devices have historically been limited to relatively narrow uses. For example, cellular phones were typically used for telephony and little else. However, as various technologies are developed allowing small footprint devices to become "smarter", having general-purpose processors, larger display screens, etc., it has become desirable to expand the scope of applications used in small footprint devices.

The containment framework may enable the types of applications and services generally associated with desktop computing environments to work together in a small footprint device, in a manner that desktop computer users are familiar with. As illustrated in FIG. 2 and described above, services and applications located within small footprint device may be implemented as modules built on the containment framework later. For example, the Personal Applications suite available from Sun Microsystems, Inc. is built using one embodiment of the containment framework. The Personal Applications Suite comprises an integrated set of applications such as a browser, an email client, and a personal organizer.

FIG. 2 also illustrates the ability of some embodiments of the containment framework to integrate off-device services with on-device applications/services. For example, the containment framework may provide an interface between a small footprint device and a network such as a Jini network. A small footprint device system may register its services for use by other devices or clients in a network. The containment framework may also enable services and applications within the small footprint device to look up and use services provided by other network devices. The integration of services of the small footprint device with network services is discussed in more detail below for FIG. 3.

FIGS. 3–7: Exemplary Network Device and Service Federation

Figure 3:
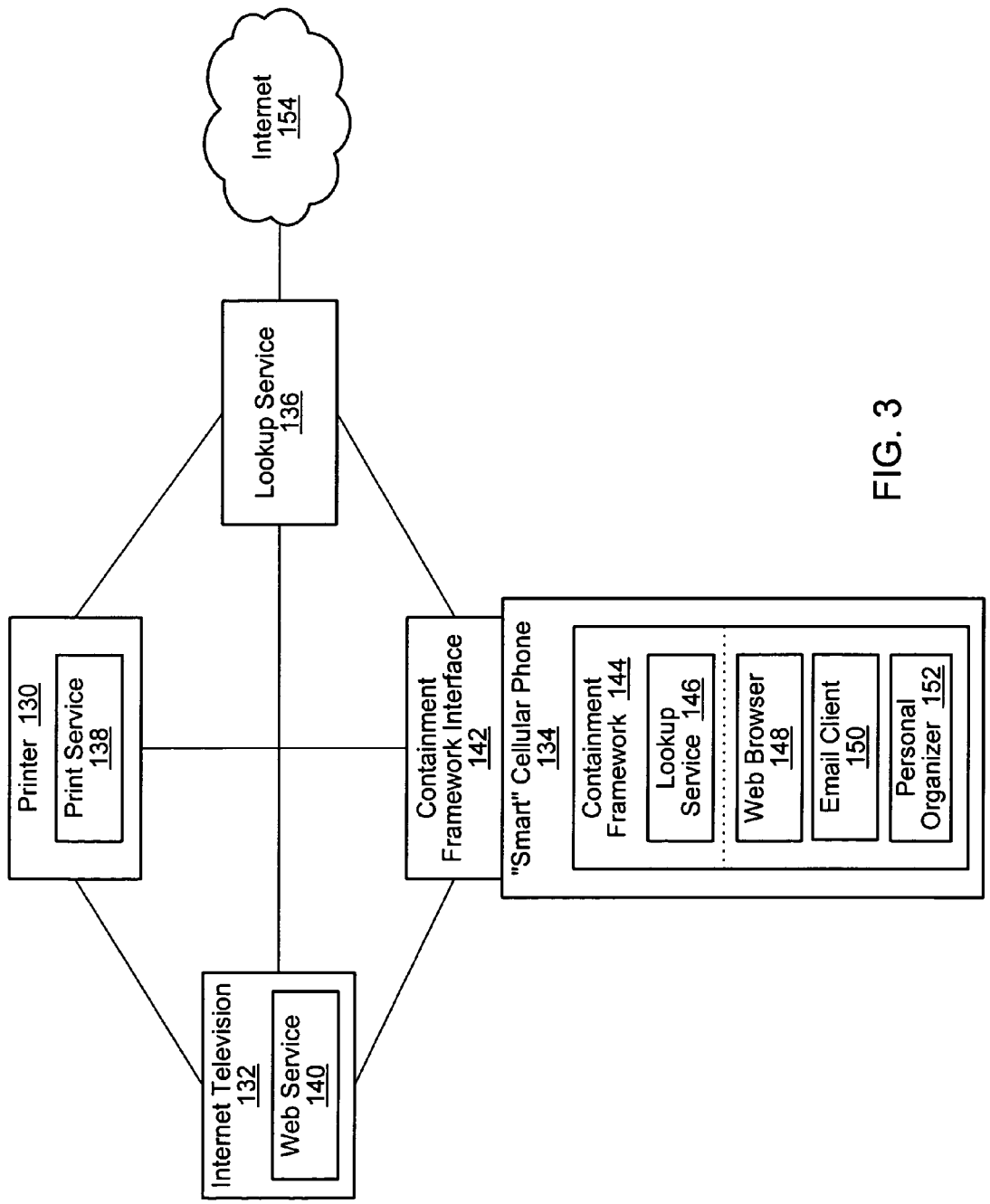
FIG. 3 illustrates an exemplary network in which a small footprint device running applications/services in the containment framework is connected to a local service-based network.

FIG. 3 illustrates an exemplary network in which a small footprint device running applications/services in the containment framework is connected to a local service-based network. In the example shown, a smart cellular phone utilizing the containment framework is connected to the network. Also shown attached to the network are a printer and an internet-enabled television. In this example, it is assumed that the printer and television devices are operable to export services to a network and possibly use the services of other devices on the network. For example, the printer may export its print service, and the internet television may look up the print service and use it to print a web page. To facilitate the federation of devices and services in this manner, a lookup service is located on the network. The lookup service may reside on a separate device such as a network server.

The federation of devices and services may be implemented in various ways. For example, Jini technology, available from Sun Microsystems, Inc., comprises components and a programming model which enables the type of distributed system illustrated in FIG. 3. In one embodiment, the local network shown in FIG. 3 may be a Jini network, and the printer and internet television may be Jini-enabled devices. Each device is operable to find the Jini network lookup service and register the services it offers with the lookup service. The lookup service maps interfaces indicating the functionality provided by a service to sets of objects that implement the service.

Figure 4:
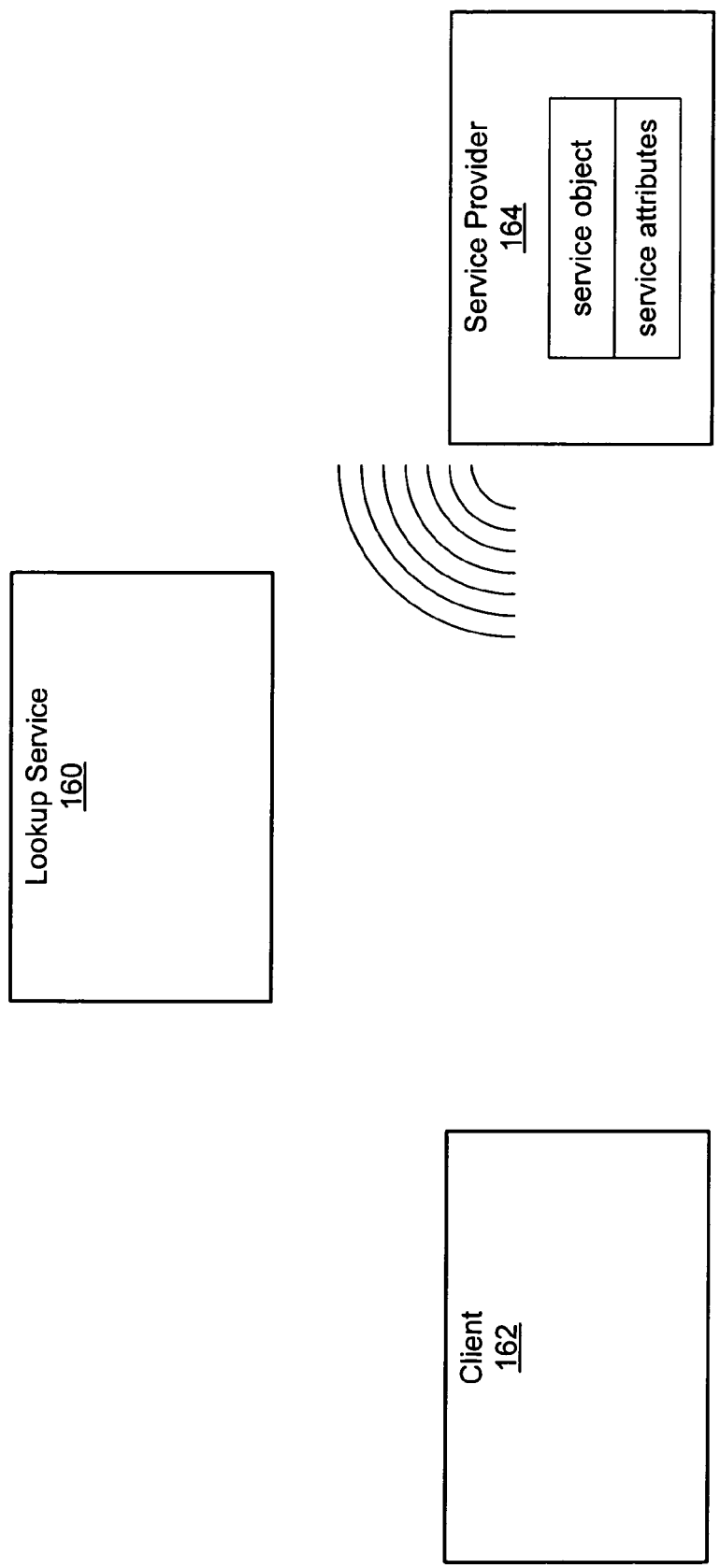
FIG. 4 illustrates the discovery process, in which a service provider finds a lookup service.

To add its services to a service federation, a device or other service provider may first locate an appropriate lookup service by using a "discovery" protocol. FIG. 4 illustrates the discovery process. As shown, the service provider, e.g. the printer shown in FIG. 3, may broadcast a request on the local network for any lookup services to identify themselves.

Figure 5:
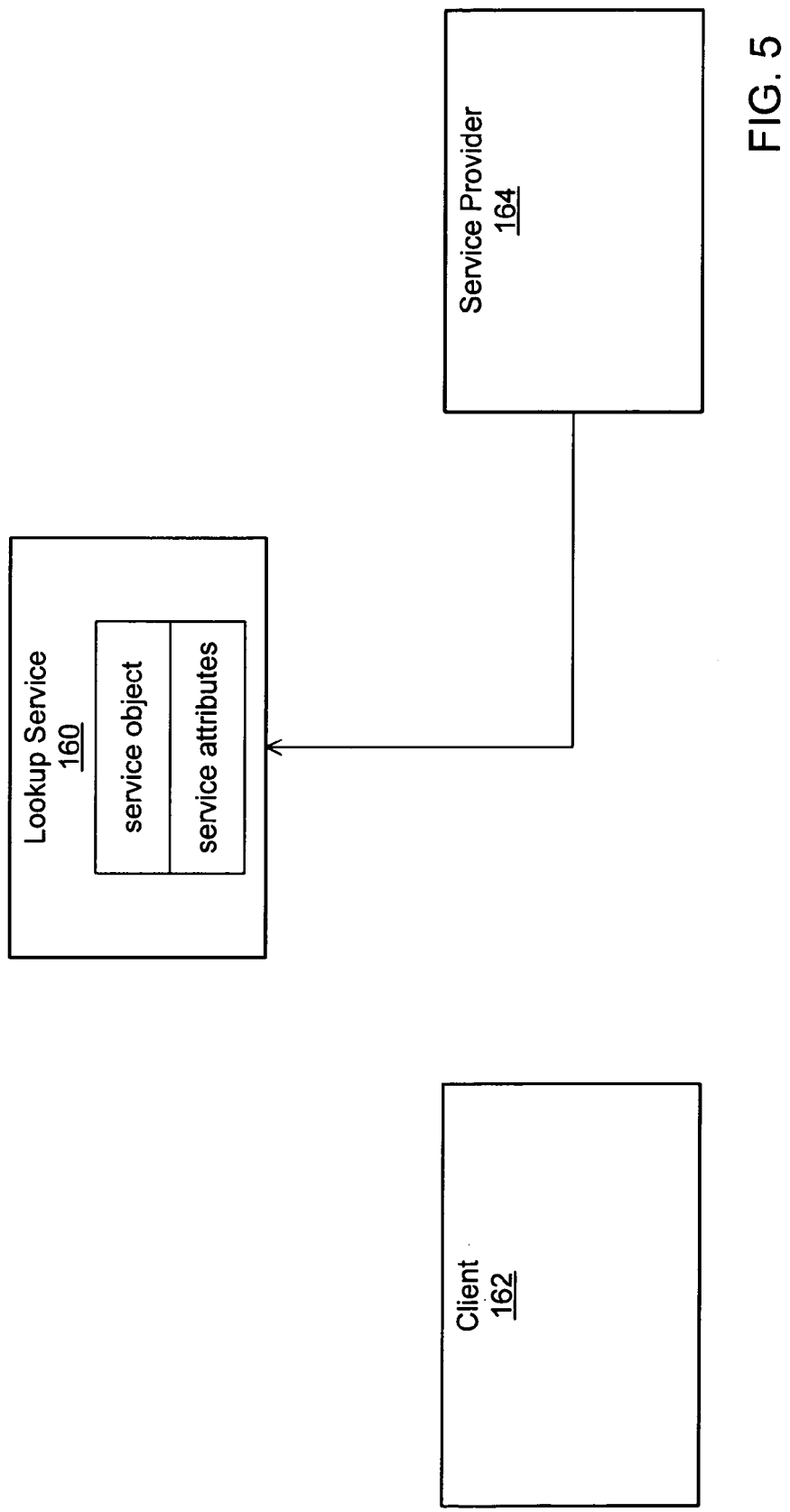
FIG. 5 illustrates the join process, in which a service provider registers its service with a lookup service.

Once the service provider has located the lookup service, it may register its service with the lookup service by using a "join" protocol. FIG. 5 illustrates the join process. The service provider may then create a service object which clients can use to invoke the service. The service object for the provided services may then be loaded into the lookup service, along with the service attributes or descriptors containing information about the types or names of services provided. For example, in a Jini network, the printer shown in FIG. 3 may create a service object which comprises a Java programming interface for the print service. It may then call a "register" method of the lookup service, passing this service object along with attributes which specify that the service being registered is a print service, the printing resolution, the possible papers sizes, etc.

Figure 6:
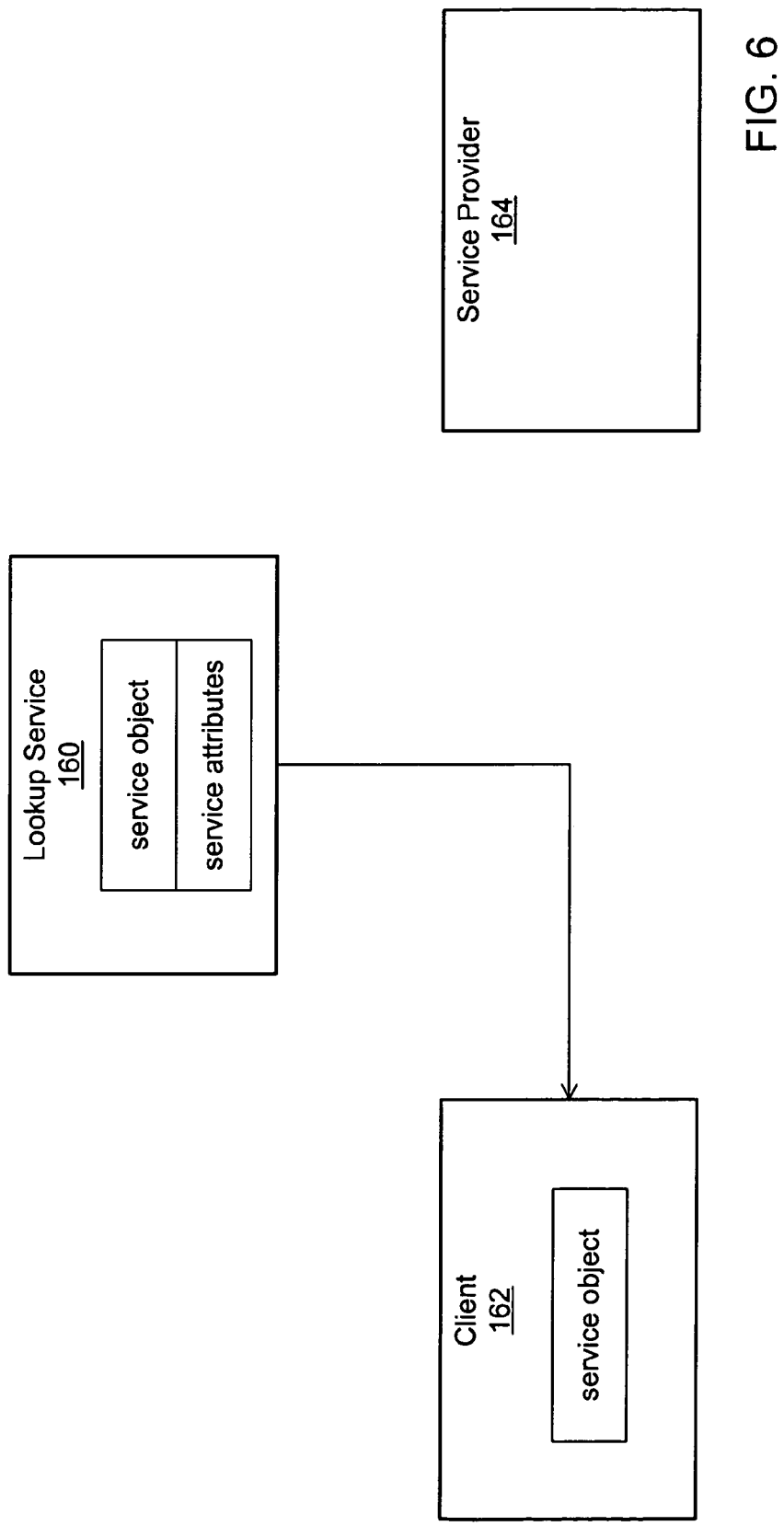
FIG. 6 illustrates the lookup process, in which a client requests a service from a lookup service.

Once the service provider has joined its services with the lookup service, other network clients may request and use the services. The process of requesting a service, called lookup, is illustrated in FIG. 6. After discovering the lookup service, a client may request a service from the lookup service using a description of the requested service. The lookup service attempts to match the description given by the requestor to the services that have joined the lookup service. The lookup service may use the service attributes provided during the join process to perform this matching. If a match is found, the lookup service provides the appropriate service object to the requestor. For example, a Java interface for the requested service may be provided to the requestor.

Figure 7:
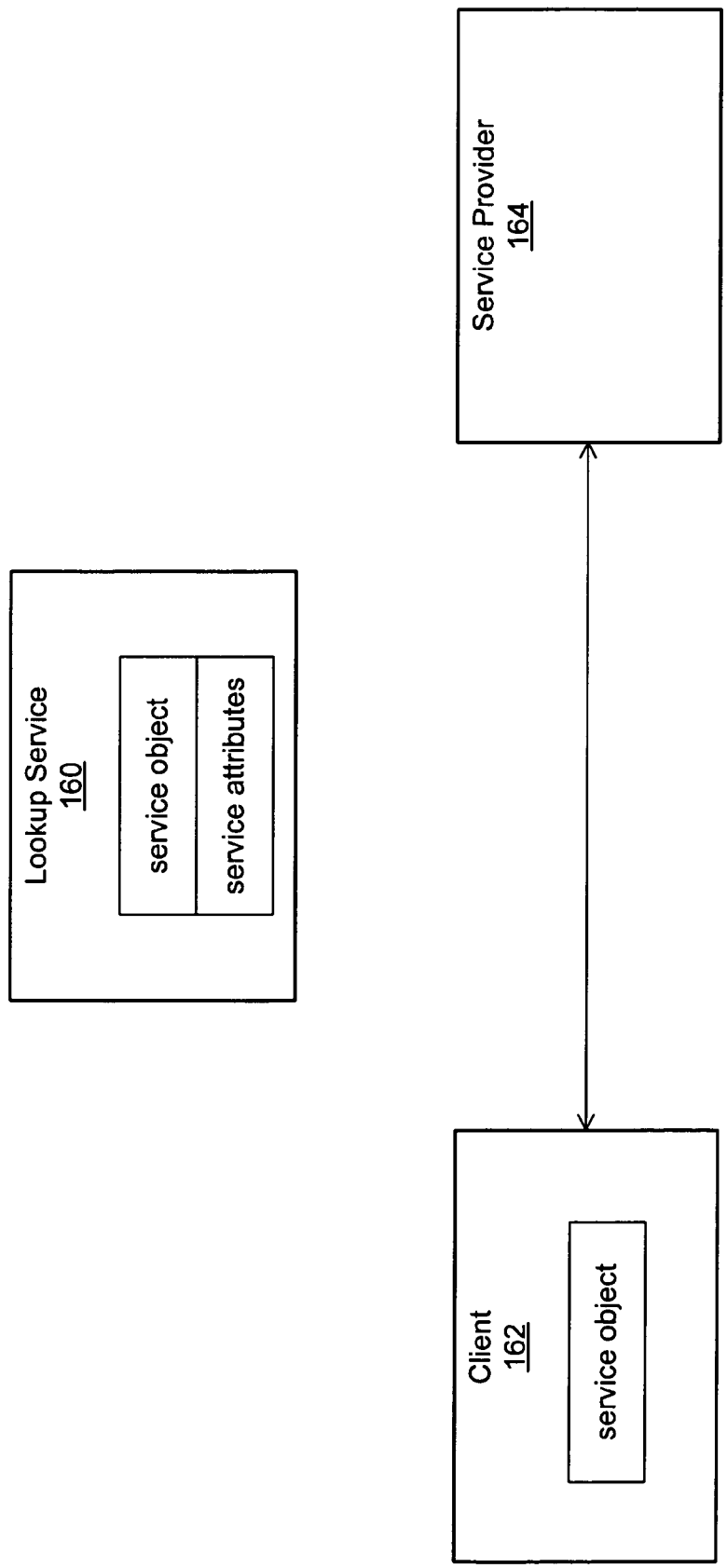
FIG. 7 illustrates the service invocation process, in which a client invokes a service using a service object received from a lookup service.

Once a client has received a service object from the lookup service, the client may invoke the service. FIG. 7 illustrates the process of service invocation. When a service is invoked, the client and the service provider may communicate directly with each other. Any of various interaction protocols may be used for this communication. For example, the protocol used may be Java Remote Method Invocation (RMI), CORBA, DCOM, etc. The service object that a requestor receives from the lookup service may call back to code located at the service provider, e.g. by calling an RMI method, or it may execute locally to provide the requested service, or it may use a combination of these approaches.

As shown in FIG. 3, the lookup service for a local network may also act as a gateway to an outside network such as the Internet. The service-based distributed computing model may thus be extended to include clients and services located outside the local network. For example, the technology being developed for the Open Service Gateway Initiative (OSGI) may be leveraged to implement this type of distributed computing system.

This type of service sharing between and across different networks and the Internet may enable new types of applications to be developed. For example, merchants may use Internet services to record data about specific consumers, and advertising service providers may use this data to push context-specific ads onto consumer devices, depending on which local network the device is connected to, etc. For example, a customer may enter a shopping mall and connect a personal data assistant (PDA) into a local network for the shopping mall, via a wireless connection. An Internet-based consumer data service may be joined with the lookup service for the shopping mall network and may provide information about the specific consumer who has just plugged into the mall network. Services running in the shopping mall network may then use this data together with other factors such as the customer's current location within the mall, the time of day, etc., in order to generate personalized ads and push them onto the customer's PDA.

Many other examples of services based on the network of FIG. 3 are possible. For example: network-enabled consumer devices within a home may utilize a service provided by a power company, via the Internet, which manages power consumption within the home; security service providers may monitor a home or specific devices via network services and may notify the owner immediately when property is broken into; health service providers may remotely monitor a patient's state by communicating with medical instruments; etc.

In the examples listed above, an assumption is made that devices are able to transparently connect to a network, integrate network services with device-resident services, and export device-resident services for use by network clients. The containment framework may provide the necessary interface to integrate services and applications of small footprint devices such as personal data assistants, handheld computers, smart cellular phones, etc. with a network service federation.

As shown in FIG. 3 and described in more detail below, the containment framework has its own type of lookup service. The lookup service within the containment framework may operate similarly to the local network lookup service described above, utilizing discovery, join, lookup, and service invocation processes. For example, the personal organizer application may utilize various services such as a calendar service, a contact list service, a bookmark service, etc. The personal organizer application may obtain a reference for communicating with these services via the containment framework lookup service.

The containment framework may integrate its own lookup service with an off-device lookup service such as the local network lookup service shown in FIG. 3. In this way, the off-device services may become available to the applications/services of the containment framework, and vice versa. For example, a personal organizer application may request a print service from the containment framework lookup service. The containment framework lookup service may first search for an on-device print service. If one is not found, the containment framework lookup service may then request a print service from the network lookup service. The service object for the print service may then be returned to the personal organizer.

As noted above, clients of services may themselves be services to other clients. For example, the email client "application" of the smart cellular phone shown in FIG. 3 may itself be a service to a client running in the containment framework or to a network client. For example, in the case of malfunction, the printer shown in FIG. 3 may request an email service so that it can send diagnostic information to a service technician. If the network lookup service cannot find a network-based email service, it may request an email service from the smart cellular phone via the interface. A service object for the email application/service running in the containment framework may be passed to the requesting printer client. In this example, the printer client may communicate directly with the email application/service to send an email containing diagnostic information to a printer service technician. The email application/service may send the email immediately if it is able to find an email server service, or it may send the email later when such a service becomes available when the cellular phone user connects to a different network.

Although the above description references specific protocols and programming models, such as Jini technology, it is noted that these specific technologies are exemplary only. For example, the applications and services within the containment framework may be integrated with clients, services, devices, networks, etc. which employ any of various types of standards, protocols, and programming models, including, but not limited to: Jini, CORBA, COM/DCOM, Bluetooth, CAL, CEBus, HAVi, Home API, HomePNA, HomePnP, HomeRF, VESA, etc.

Figure 8:
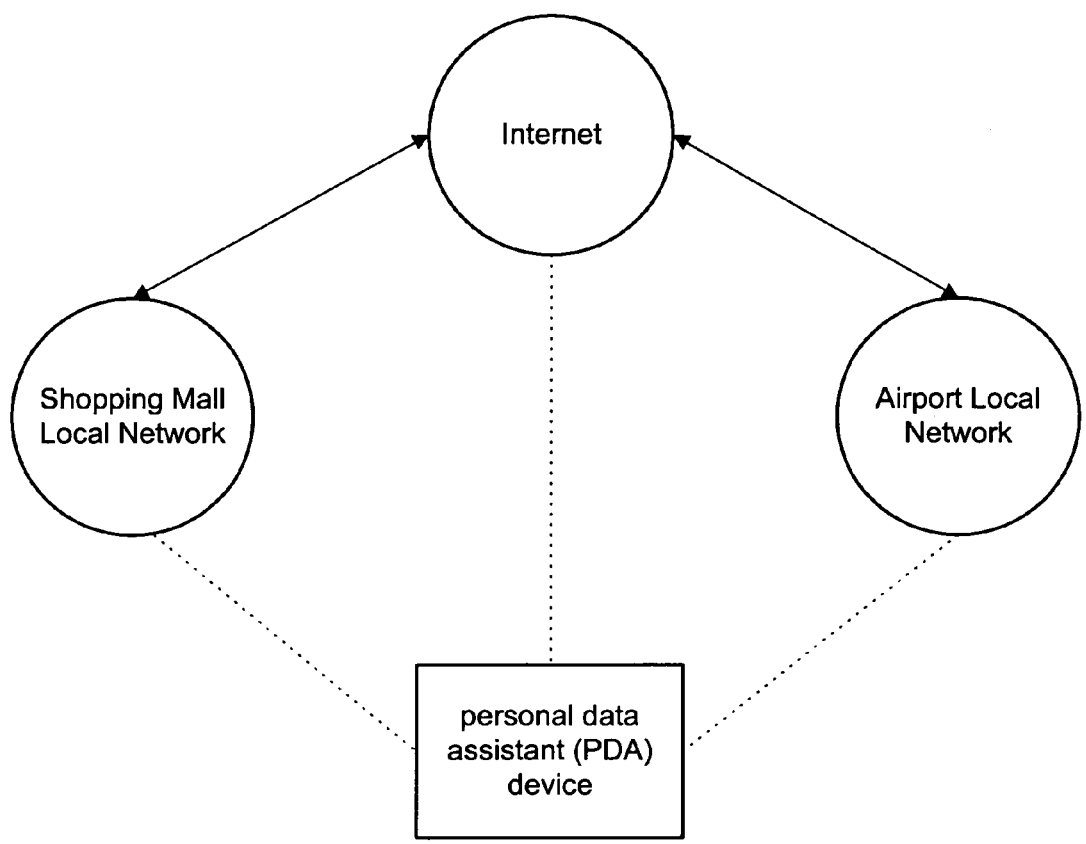
FIG. 8 is a block diagram illustrating various networks which may deliver personalized content to a small footprint device.

FIG. 8—Network Mobility

FIG. 8 is an abstract block diagram illustrating various types of networks which small footprint device users may connect to. FIG. 8 is exemplary; services running on many other types of networks of varying scales may be integrated with services running on small footprint devices.

In the example of FIG. 8, services may run on the small footprint device and on network-based devices which coordinate to send data regarding the small footprint device user to an off-device service and store the information in a network. Such information may include demographics data, buying habits, web-browsing habits, geographic location, current weather conditions at the user's location, etc. Other services may retrieve the stored information and use it to generate personalized content to send to the small footprint device. Other types of information such as current stock market conditions, etc. may also be factored into rendering the personalized content.

For example, a user may connect a small footprint device such as a personal data assistant to a shopping mall network, such as a Jini network. On-device and off-device services may coordinate to record the user's purchases and store this information in a location based on the mall network or another network such as another network accessible from the Internet. The user may later fly to another city and connect the personal data assistant to a local network in the destination city airport. Services running on the airport based network may then coordinate with on-device services to display personalized content to the user. For example, if the airport network service may retrieve the information stored earlier regarding the user's shopping mall purchases and display an advertisement based on this information. For example, if the purchases included sports apparel, the airport-based service may push an ad for game tickets to see the airport's city basketball team later that night.

Figure 9:
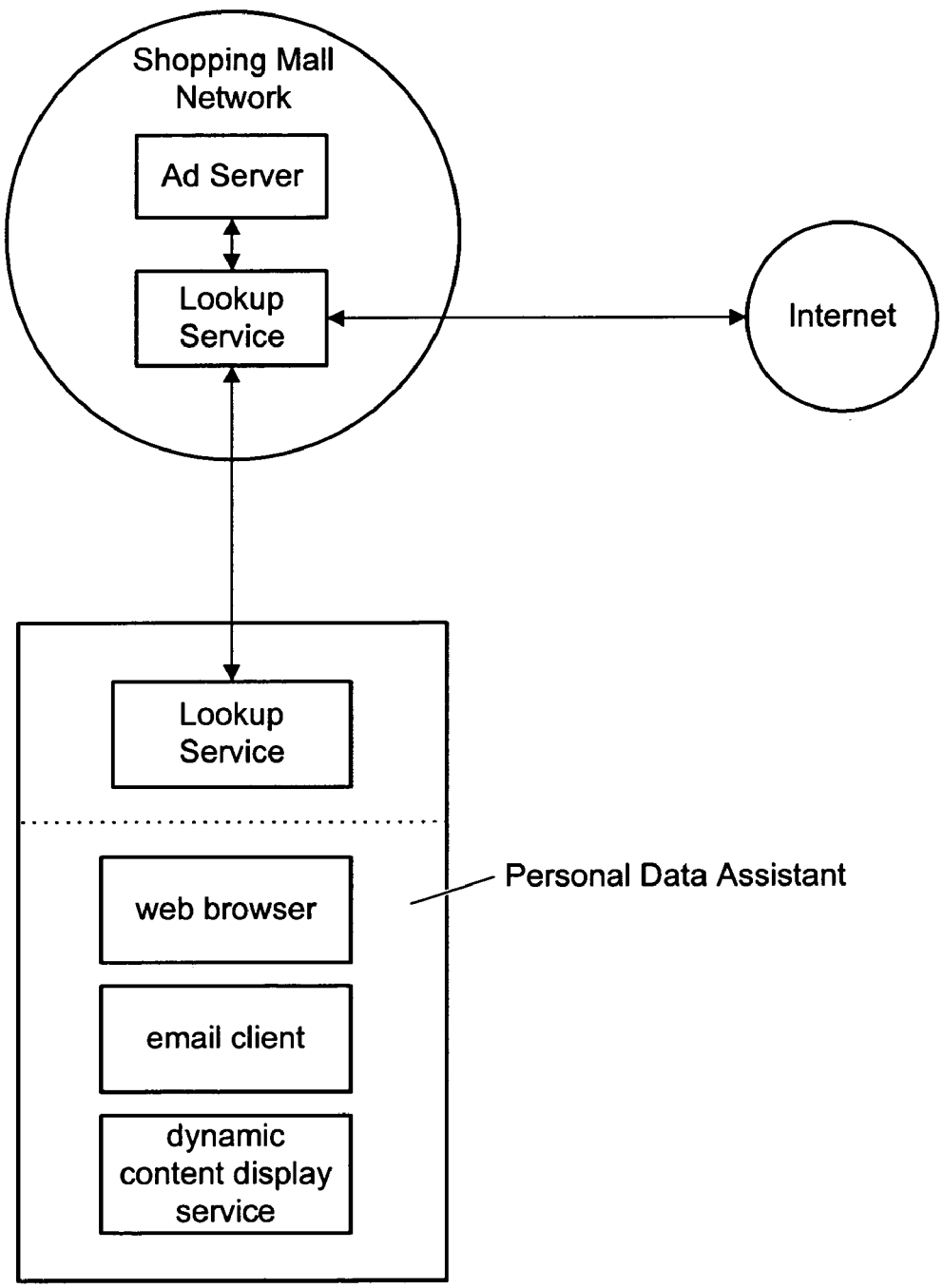
FIG. 9 is a block diagram illustrating the integration of services running on a small footprint device with off-device services to enable dynamic display of personalized content on the small footprint device.

FIG. 9—Delivering Personalized Content to a Small Footprint Device

FIG. 9 is a block diagram illustrating the integration of services running on a small footprint device with off-device services to enable dynamic display of personalized content on the small footprint device. FIG. 9 is exemplary, and the content delivery system and method may take on various other embodiments.

A service may execute within the application/service containment framework of the small footprint device which communicates with an off-device service. The on-device service may send information regarding the identity of the small footprint device user to the off-device service. The off-device service may use this information to access personal information about the user from a network-based service, such as a service based on the internet or on the local network. This data may include, demographic data, web browsing habits, geographic information, etc. The on-device service may also send dynamic data to the off-device service. For example, if the small footprint device is connected to a shopping mall network, the on-device service may send information regarding which store the user is currently in. The off-device service may then analyze and integrate the various types of information in order to send personalized content such as personalized advertisements to the user's small footprint device.

The on-device service may then display the personalized content. The content may be displayed in a user interface specialized to accept such content, or it may be integrated into the user interface of other applications/services. The on-device service may be operable to filter or reject content. The content may be very small in order to conserve space which may be very limited for a small footprint device.

Figure 10:
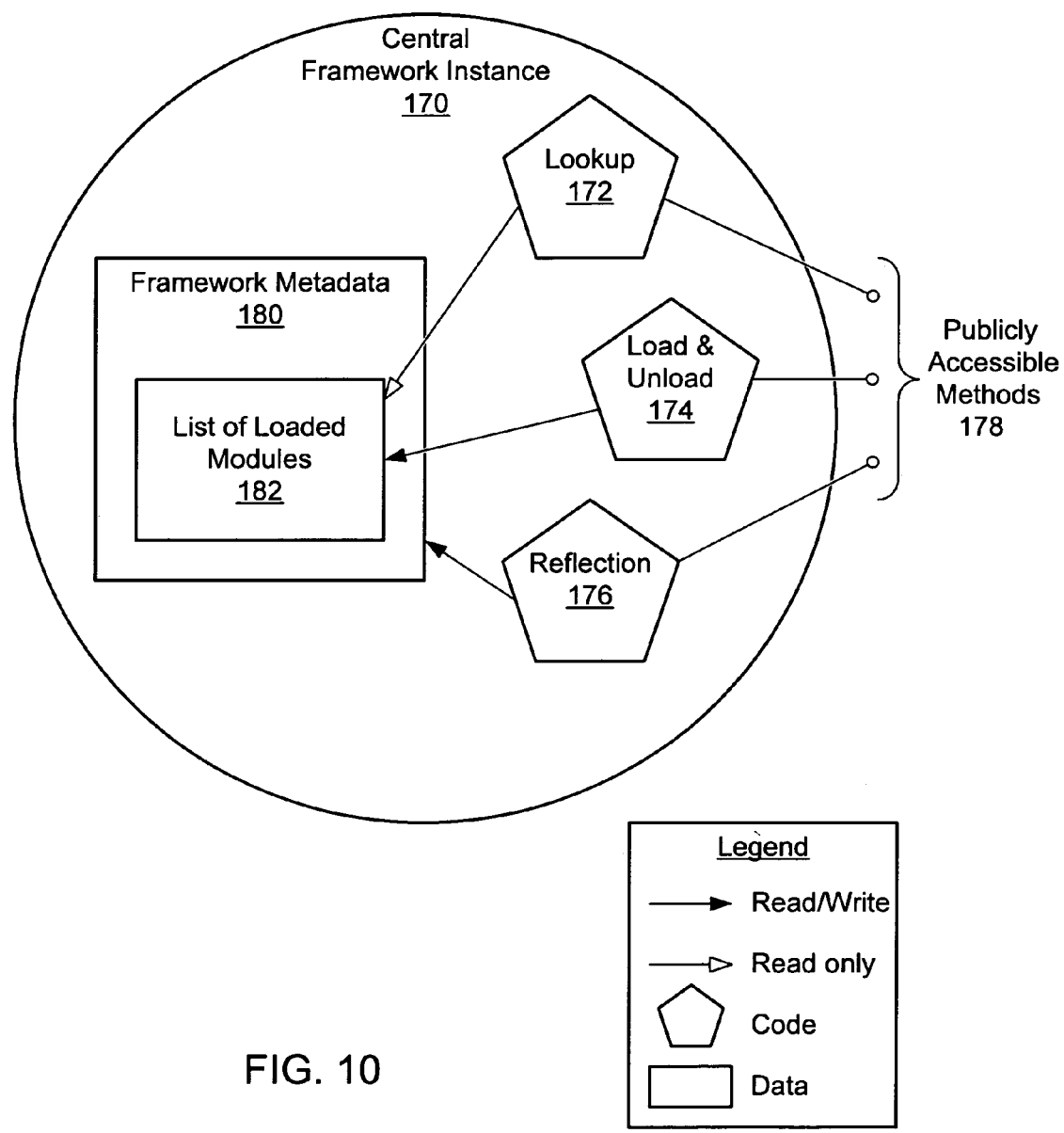
FIG. 10 is an abstract block diagram illustrating the basic architecture of the containment framework.

FIG. 10—Containment Framework Block Diagram

FIG. 10 is an abstract block diagram illustrating the basic architecture of the containment framework environment. As described above, the containment framework provides a containment system for applications and services. These applications and services are managed within the system as units called modules. The containment framework is lightweight; in one embodiment, modules may interact with a single framework manager object which performs all module management. This manager is referred to herein as the central framework instance. In one embodiment, the central framework instance may be implemented as an instance of a Java class. FIG. 10 illustrates the central framework instance and the code and data it comprises.

As shown in FIG. 10, the central framework instance comprises data representing the modules currently loaded in the system. The containment framework architecture is non-hierarchical. Thus, the loaded modules may be represented as a flat list or array of modules. This non-hierarchical system helps to keep the core containment framework code and the modules running within the framework small. Systems employing hierarchical components such as JavaBeans components may provide associated benefits, but the benefits come at the expense of a more complex management system requiring more system resources. However, the containment framework does provide a mechanism for the non-hierarchical modules to gain many of the benefits of a hierarchical containment system. This mechanism is described below for FIGS. 11 and 12.

As shown in FIG. 10, the central framework instance comprises data representing the modules currently loaded in the system. The containment framework is non-hierarchical. Thus, the loaded modules may be represented as a flat list or array of modules. This non-hierarchical system helps to keep the core containment framework code and the modules running within the framework small. Systems employing hierarchical components such as JavaBeans components may provide associated benefits, but the benefits come at the expense of a more complex management system requiring more system resources. However, the containment framework does provide a mechanism for the non-hierarchical modules to gain many of the benefits of a hierarchical containment system. This mechanism is described below for FIGS. 11 and 12.

As shown in FIG. 10, the central framework instance comprises publicly accessible methods which modules may call. These methods may be broken into three abstract groups. One group of methods comprises lookup methods. These methods implement the lookup service functionality described above. Modules may pass a module descriptor to a lookup method of the central framework instance to locate a particular service module. The containment framework lookup process is described below for FIG. 14. Another group of framework methods comprises methods for loading and unloading modules. After finding a service module, a client module may request the central framework instance to load the service module and return a reference to the loaded module. The client module may then invoke the service. The client may call a framework method to release the service module when it is finished using it. Although described as distinct groups, the division of methods into lookup and load/unload groups may be only a conceptual division. For example, in one embodiment a lookup method may also load a module that it matches and return a reference to the matched module.

FIG. 10 also illustrates system data referred to as metadata, which may comprise data describing the list of loaded modules and other data describing the state of the system. A third abstract group of methods of the central framework instance comprises reflection methods. Reflection methods are somewhat different than the other groups of methods since they provide direct access to the core metadata. A special class of modules called system modules may call reflection methods to gain access to the metadata. Regular modules may not access the metadata.

After receiving a reference to the core system data, a system module may use or modify the data in any way desirable. Thus, the containment framework is highly extendable. The central framework instance may itself remain small, and system modules may be added to implement any functionality not already enabled by the central framework instance. For example, a system module may enable the integration described above for FIGS. 3–7 between applications/services running within the containment framework and services based in an external network.

In this example, such a system module may be written as a secondary lookup service that conforms to the protocols and programming model of the external network. For example, for a Jini network, a system module may be written which discovers the Jini network lookup service and joins the network lookup service, registering itself as a secondary lookup service. When a network client requests a service, the network lookup service may invoke the lookup service implemented by the system module. This system module may attempt to find a service module within the containment framework which matches the description of the requested service. If a match is found, then the system module may perform any necessary steps to export the service module to the network client, since the system module has full access to the system module list and metadata. For example, the system module may load and register the matched service module into the system and return an interface, such as a Java interface, to the newly loaded module to the requester.

FIGS. 11 and 12—Simulating a Hierarchical Environment

It is often desirable to establish a hierarchical context for modules. For example, several service modules of the same type may be present in a system, but each may behave slightly differently. In a hierarchical containment system, a request by a module for a service may be filtered through a parent or containing module of the requesting module so that a reference to a specific service module may be passed back to the requestor. Hierarchical containment also has other inherent advantages, such as an ability to easily distribute and store data among a hierarchy of modules. However, as stated above, a full implementation of a hierarchical containment system may be very costly in terms of the system resources required, such as memory and processing power. The containment framework may provide a mechanism giving developers and applications many of the benefits of hierarchical containment, but without the high overhead costs usually associated with it.

For example, one embodiment of the containment framework allows modules to register themselves as module request listeners of other modules. For example, a module A may register itself as a request listener of a module B, e.g., by calling an AddRequestListener method of the central framework instance. When module B subsequently calls a method of the central framework instance to find a particular service, the central framework instance checks for any module request listeners for module B. In this case, it finds module A as a request listener, and asks module A to provide the requested service module to module B.

FIGS. 11 and 12 illustrate an exemplary use of module request listeners in the containment framework. FIG. 11 illustrates a desired conceptual module hierarchy for print services. As shown in the figure, two print service modules and, print service A and print service B, are encapsulated in a print manager module. For example, the two print services and may print to different locations, have different resolution and color capabilities, etc. Either of these print service modules may satisfy a lookup request made by another module for a print service. However, it may be desirable to employ a print manager module which selects and returns a particular print service. For example the print manager may select a print service based on which client module makes the print request, or the print manager may display a dialog box asking for user input for the desired print service characteristics.

Although the containment framework utilizes a non-hierarchical containment model, the hierarchy illustrated in FIG. 11 may be realized by registering the print manager module as a module request listener of client modules that may request a print service. FIG. 12 illustrates example modules which may run in a system. As described earlier, these modules may themselves employ other modules as services. According to the non-hierarchical model of the containment framework, the modules are shown arranged in a flat layout, with no inherent module hierarchy.

In this example, the web browser module may be operable to make a print request, e.g., for printing a web page. As shown in FIG. 12, the print manager module may be registered as a module request listener for the web browser module. Upon receiving the print service request from the web browser, the containment framework lookup service may find the print manager module registered as a request listener for the web browser and ask the print manager module to provide a print service module to the web browser requestor. The print manager module may then return print service module A or B, or it may present a dialog box to the user to decide which print service module to return, etc. Thus, the desired module hierarchy of FIG. 11 may be implemented for non-hierarchical modules of the containment framework.

Figure 13:
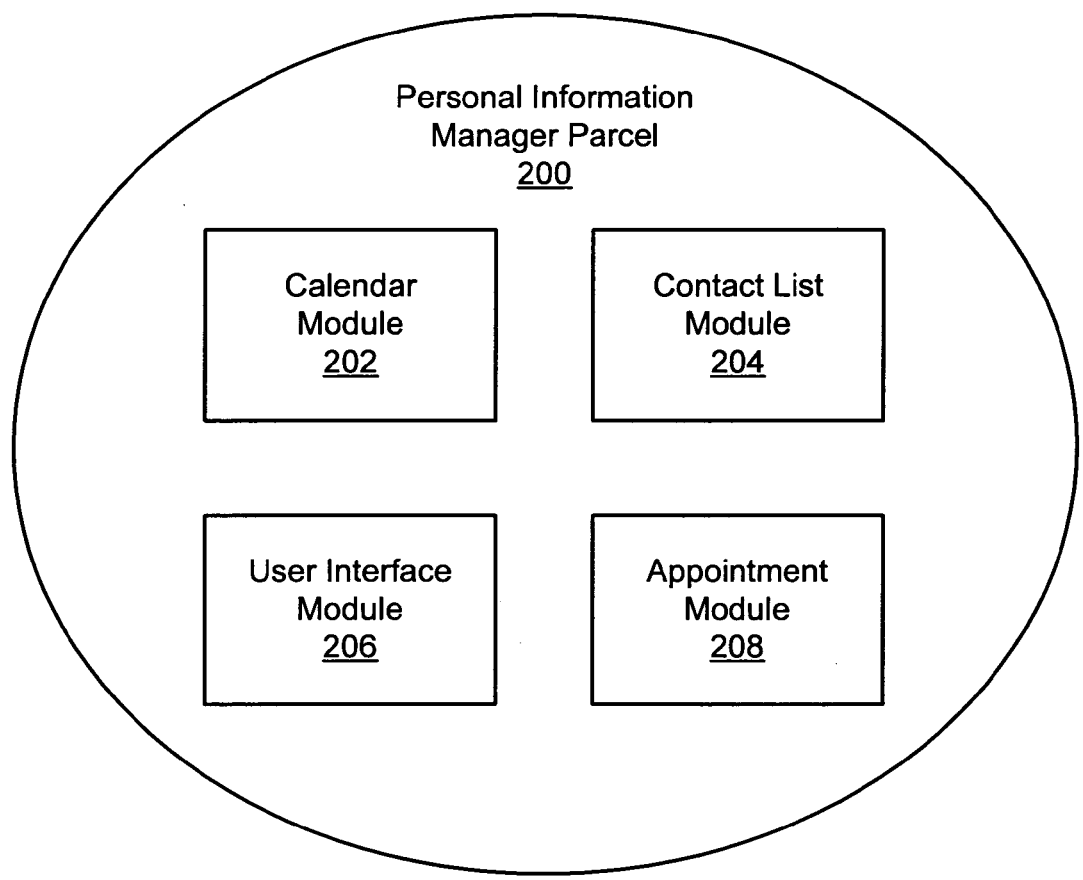
FIG. 13 illustrates the use of parcels to group modules together.

FIG. 13—Parcel Packaging Units

Modules may be packaged into units referred to as parcels. This packaging serves several purposes. For example, parcels provide a convenient mechanism to manage related code and data as a unit. If closely related modules have static dependencies, then they may be packaged together into a parcel. Parcels may be used to handle installation and upgrading within a system.

FIG. 13 illustrates an example parcel that groups together modules related to a personal information manager (PIM). The figure shows a calendar module, a contact list module, an appointment module, and a user interface module. Various other modules may be present in the parcel as desired. The modules of the PIM parcel may also make use of various core service modules, such as bookmark services, find services, etc. The use of a PIM parcel may simplify installation and upgrading of a PIM application. Packaging the PIM modules into a parcel in this way also has the development-time benefit of creating separate code units for multi-target development.

Parcels also provide an additional way to provide a run-time context for non-hierarchical modules. When a module is loaded into the system, the central framework instance may store metadata specifying which parcel, if any, the module belongs to. Service modules may later use this information to provide services differently for different client modules, depending on which parcel the client belongs to. For example, client modules may use a file access service module to obtain a root directory. The file access module may return different root directories for different clients, depending on which parcels the clients belong to.

Figure 14:
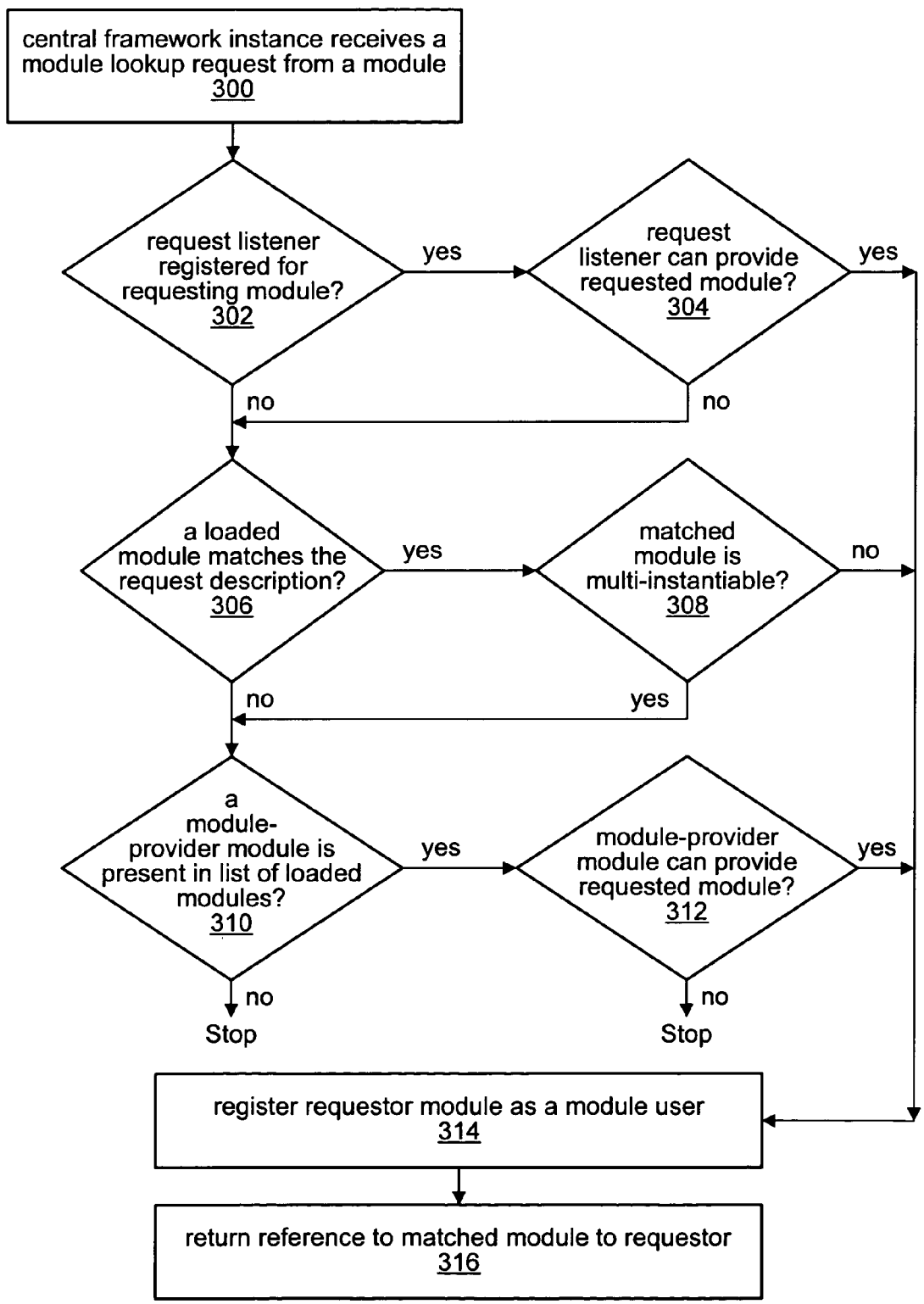
FIG. 14 is a flowchart diagram illustrating a typical lookup process that the central framework instance may perform when it receives a lookup request for a service module from a client module.

FIG. 14—Module Request Flowchart Diagram

FIG. 14 is a flowchart diagram illustrating a typical lookup process that the central framework instance may perform when it receives a lookup request for a service module from a client module. It is noted that FIG. 14 is exemplary and that various steps may be combined, omitted, or modified. For example, as noted previously, system modules may be added which customize the lookup process.

In step 300 of FIG. 14, the central framework instance receives a module lookup request from a requestor module. For example, the requestor module may call a RequestModule method of the central framework instance, passing a module descriptor for the service module being requested, as well as a reference to the requestor module itself. The reference to the requestor module may be added to the system data so to keep track of service module users. As described in more detail below, a module may be unloaded when no other modules are using it.

The module descriptor passed by the requestor module specifies various attributes about the requested module that the framework instance can use to attempt to find a matching module. This module descriptor may be an object which comprises information such as the requested module's service type, class name, and/or service-specific attributes, etc. The requestor may also pass a text description to the central framework instance, which the central framework instance may use to create a module descriptor object.

In step 302, the central framework instance checks to see whether any request listener modules are registered for the requesting module. If a request listener is found, then in step 304 the framework instance notifies the request listener of the request and instructs the request listener to attempt to provide a module which matches the module request descriptor. If the request listener can provide a matching module, then execution proceeds to step 314. Otherwise, other registered request listeners may be asked to provide a module, until a match is found or there are no more request listeners.

If no request listeners are found, or if no request listeners can provide the requested module, execution proceeds to step 306. However, in one embodiment, if one or more request listeners are registered for the requesting module, and none of them are able to provide a matching module, then execution may stop after step 304. In step 306, the central framework instance checks the list of modules to determine whether one of the modules matches the module descriptor. If a match is found, then in step 308 the framework instance checks whether the matched module is multi-instantiable. If not, then execution proceeds to step 314.

If the matched module is found to be multi-instantiable in step 308, then the central framework instance may continue to search through the module list for a match. If there are no more modules to search, execution proceeds to step 310. In step 310, the framework instance searches for module-provider modules in the module list. Module-provider modules are modules capable of providing a requested module. For example, a network lookup service may be imported as a module-provider module for the containment framework.

If a module-provider module is found, then in step 312, the central framework instance notifies the module-provider module of the request and instructs it to attempt to provide a module which matches the module request descriptor. If a match is found then execution proceeds to step 314. If the module provider cannot provide the requested module, the central framework instance may search for other module-provider modules and repeat step 312. If no module providers are present in the module list or if none can provide the requested module, then the requestor is notified that the request cannot be fulfilled, and execution completes.

Step 314 may be reached from step 304, 308, or 312. In all cases, a module is found which matches the module request descriptor. In step 314 the requestor is registered as a user of the matched module, and in step 316 a reference to the matched module is returned to the requestor. Any necessary initialization steps involved in loading and initializing the matched module are also performed in step 314. For example, modules may have an Initialize method that is called when a module is loaded.

As noted above, the flowchart of FIG. 14 is exemplary, and various embodiments may have different lookup/load scenarios. For example, a module may call a central framework method to load a service module without returning a reference to the matched module, or request listeners may be ignored in some cases, etc.

Figure 15:
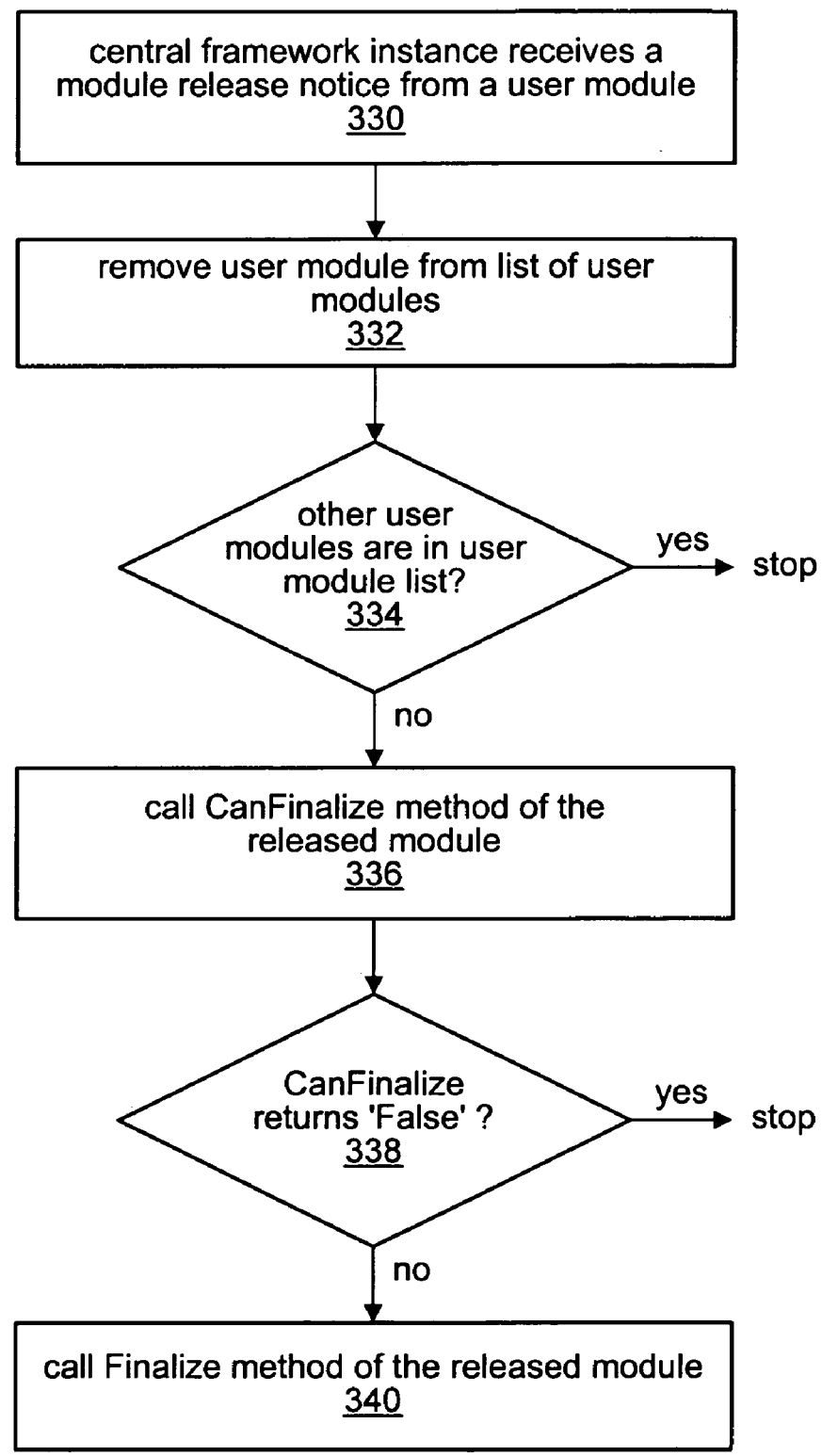
FIG. 15 is a flowchart diagram illustrating the module release process.

FIG. 15—Module Release Flowchart Diagram

When a client module is finished using a service module, the client may call a method of the central framework instance to release the module. FIG. 15 is a flowchart diagram illustrating the module release process. The flowchart of FIG. 15 is exemplary, and various steps may be combined, omitted, added, or modified as required or desired for different embodiments.

In step 330, the central framework instance receives a module-release notice from a user module. As described above for FIG. 14, when a user module requests a service module, the user module is added to a list of users of the service module. In step 332, the central framework instance removes the releasing user module from the list of users of the released module. In step 334, the framework instance determines whether any other user modules are using the released module, e.g., by checking whether other modules are present in the releases module's user module list. If so, then execution stops.

If no other modules are using the released module, the central framework instance may attempt to unload the released module. In step 336, the framework instance may call a CanFinalize method of the released module. The CanFinalize method returns true if the module can be unloaded, or false otherwise. If the CanFinalize method returns false in step 336, then execution stops. Otherwise, a Finalize method of the released module may be called. The Finalize method may perform any necessary steps for unloading the module, such as releasing resources. The module may then be unloaded, which may involve garbage-collection, etc., depending on the particular embodiment.

Although the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for sending content to a device, the method comprising:
   the device connecting to a first network;
   the device communicating with a service accessible from the first network to send information to the service accessible from the first network;
   the service accessible from the first network storing the information;
   the service accessible from the second network communicating with the device to send the content to the device.

2. The method of claim 1, further comprising:
   the device displaying the content.

3. The method of claim 2,
   wherein the device executes a service for displaying dynamically generated content;
   wherein said device displaying the content comprises the service for displaying dynamically generated content displaying the content.

4. The method of claim 1, further comprising:
   the device rejecting the content.

5. The method of claim 1, further comprising:
   the device filtering the content.

6. The method of claim 1,
   wherein the first network is a local area network (LAN);
   wherein the service accessible from the first network executes on a computer system in the first network.

7. The method of claim 1,
   wherein the second network is a local area network (LAN);
   wherein the service accessible from the second network executes on a computer system in the second network.

8. The method of claim 1,
   wherein said sending information to the service accessible from the first network comprises sending information regarding a user of the device to the service accessible from the first network;
   wherein said service accessible from the second network generating content based on the information comprises the service accessible from the second network generating content based on the information regarding the user of the device.

9. The method of claim 8,
   wherein said service accessible from the second network generating content based on the information regarding the user of the device comprises the service accessible from the second network generating personalized advertising content based on the information regarding the user of the device.

10. The method of claim 8,
    wherein said sending information regarding a user of the device to the service accessible from the first network comprises sending one or more of:
    demographic data regarding the user;
    information specifying buying habits of the user;
    information specifying web-browsing habits of the user;
    information specifying a geographic location of the user.

11. The method of claim 8,
    wherein said sending information regarding a user of the device to the service accessible from the first network comprises sending information specifying one or more items the user has purchased;
    wherein said service accessible from the second network generating content based on the information comprises the service accessible from the second network generating personalized advertising content based on the one or more items the user has purchased.

12. The method of claim 1, further comprising:
    the device communicating with the service accessible from the second network to send information specifying a store in which a user of the device is currently located;
    wherein the service accessible from the second network generates the content based on the information and based on the store in which the user is currently located.

13. The method of claim 1,
    wherein said service accessible from the second network generating content based on the data comprises the service accessible from the second network generating advertising content based on the data.

14. The method of claim 1,
    wherein said device connecting to the first network comprises the device automatically connecting to the first network without a user requesting the device to connect to the first network.

15. The method of claim 1,
    wherein the first network is a Jini network.

16. The method of claim 1,
    wherein the second network is a Jini network.

17. The method of claim 1,
    wherein said device communicating with the service accessible from the first network to send information to the service accessible from the first network comprises a first service executing on the device communicating with the service accessible from the first network to send the information to the service accessible from the first network;
    wherein said service accessible from the second network communicating with the device to send the content to the device comprises the service accessible from the second network communicating with a second service executing on the device to send the content to the device.

18. A method for sending content to a device, the method comprising:

the device connecting to a local area network (LAN);

the device communicating with a first service executing on the LAN to send information to the first service;

the first service executing on the LAN storing the information on the LAN;

a second service executing on the LAN retrieving the information stored by the first service;

the second service executing on the LAN generating content based on the information; and the second service executing on the LAN communicating with the device to send the content to the device.

19. The method of claim 18, wherein said first service executing on the LAN comprises a first service executing on a computer system in the LAN;

wherein said second service executing on the LAN comprises a second service executing on a computer system in the LAN.

20. The method of claim 18, wherein said storing the information on the LAN comprises storing the information on a computer system in the LAN.

21. The method of claim 18, wherein said storing the information on the LAN comprises storing the information on a file system in the LAN.

22. The method of claim 18, further comprising: the device displaying the content.

23. The method of claim 18, further comprising:

the device rejecting the content.

24. The method of claim 18, further comprising:

the device filtering the content.

25. The method of claim 18, wherein said sending information to the first service comprises sending information regarding a user of the device to the first service;

wherein said second service generating content based on the information comprises the second service generating personalized advertising content based on the information regarding the user of the device.

26. A method for sending content to a device, the method comprising:

the device connecting to a local area network (LAN);

the device communicating with a first service executing on the LAN to send information to the first service;

the first service executing on the LAN storing the information received from the device;

the first service executing on the LAN generating content based on the information; and the first service executing on the LAN communicating with the device to send the content to the device.

27. The method of claim 26, wherein said first service executing on the LAN comprises a first service executing on a computer system in the LAN.

28. The method of claim 26, wherein said first service executing on the LAN generating content based on the information comprises the first service executing on the LAN retrieving the stored information at a later time and generating the content based on the information.

29. The method of claim 26, further comprising: the device displaying the content.

30. The method of claim 26, further comprising:

the device rejecting the content.

31. The method of claim 26, further comprising:

the device filtering the content.

32. The method of claim 26, wherein said sending information to the first service comprises sending information regarding a user of the device to the first service;

wherein said first service generating content based on the information comprises the first service generating personalized advertising content based on the information regarding the user of the device.

33. A system comprising:

a device;

a first network, wherein the first network includes a first service operable to communicate with the device; and a second network, wherein the second network includes a second service operable to communicate with the device;

wherein the device is operable to connect to the first network to send information to the first service;

wherein the first service is operable to store the information;

wherein the device is operable to connect to the second network;

wherein the second service is operable to retrieve the information stored by the first service and generate content based on the information;

wherein the second service is operable to send the content to the device; and wherein the device is operable to display the content.

34. A system comprising:

a device; and a local area network (LAN), wherein the LAN includes a first service operable to communicate with the device and a second service operable to communicate with the device;

wherein the device is operable to connect to the LAN to send information to the first service;

wherein the first service is operable to store the information on the LAN;

wherein the second service is operable to retrieve the information stored by the first service and generate content based on the information;

wherein the second service is operable to send the content to the device; and wherein the device is operable to display the content.

* * * * *

UNITED STATES PATENT AND TRADEMARK OFFICE
CERTIFICATE OF CORRECTION

PATENT NO. : 6,993,570 B1  Page 1 of 1
DATED : January 31, 2006
INVENTOR(S) : Boman Irani It is certified that error appears in the above-identified patent and that said Letters Patent is hereby corrected as shown below:

<u>Column 15,</u>
Line 43, add -- a service accessible from a second network receiving the information from the service accessible from the first network;

the service accessible from the second network generating content based on the information; and --.

Signed and Sealed this

Thirteenth Day of June, 2006

JON W. DUDAS
*Director of the United States Patent and Trademark Office*